Aug. 27, 1940.  W. D. BUCKINGHAM  2,212,634

RELAY TESTING METHOD AND APPARATUS

Filed May 23, 1936

INVENTOR
W. D. BUCKINGHAM
BY
Eugene L. Brown
ATTORNEY

Patented Aug. 27, 1940

2,212,634

UNITED STATES PATENT OFFICE 2,212,634

RELAY TESTING METHOD AND APPARATUS

William D. Buckingham, Southampton, N. Y., assignor to The Western Union Telegraph Company, New York, N. Y., a corporation of New York Application May 23, 1936, Serial No. 81,499

16 Claims. (Cl. 175—183)

This invention relates to methods and apparatus for testing relays and for indicating certain operating characteristics of a relay under test and the existence of contact chatter in a manner to facilitate the proper adjustment of the relay.

A large number of relays are employed in signaling and communication systems and the operation of the systems depends upon the proper functioning of the individual relays. For example, in multiplex and simplex telegraph systems for high speed telegraph communication, the operation of the systems depends upon the correct functioning of numerous polar relays, such as repeating or line relays. The operating speed and reliability of the system depend upon the proper adjustment of these relays.

These relays may be, for example, of the type disclosed in the patents to Finn, No. 1,160,097 dated November 9, 1915, or Reissue No. 14,304 dated May 22, 1917. When used as line relays in a telegraph system, these relays must be so adjusted that they are not biased, that the travel time between contacts is between certain limits, and contact chatter or bounce is substantially eliminated. In actual practice, since the transmission depends upon the operating characteristics of these relays, each relay must be tested frequently and readjusted, if necessary.

In general terms, the object of this invention is to provide an improved and simplified method of testing relays, including both polarized and neutral relays, in order to facilitate the proper adjustment of said relays.

A further object of the invention is to arrange a cathode ray oscillograph to indicate one or more of the following characteristics of the relay: first, the travel time of the armature between contacts; second, the number and character of the contact bounces as the armature engages each contact; third, the firmness of contact between movable and stationary contacts of the relay as affected by the surfaces of the contacts and freedom from dirt and foreign matter; fourth, the existence of mechanical or electrical bias in the relay; fifth, the equality or lack of equality of contact time as the relay is periodically energized and deenergized at a uniform rate; sixth, the operating time or the time that elapses between the application of operating voltage to the relay and the time when the relay armature starts to move or completes its movement.

It has been found that a cathode ray oscillograph may be so connected to the relay under test as to trace a pattern upon the screen of the oscillograph representing the operating characteristics of the relay. The pattern that is obtained in this manner while the relay is subjected to conditions simulating those encountered in actual practice provides information obtainable in no other known way.

Other objects and the advantages of the invention will appear from the following description of the embodiment thereof shown in the accompanying drawing, wherein.

Figure 1:
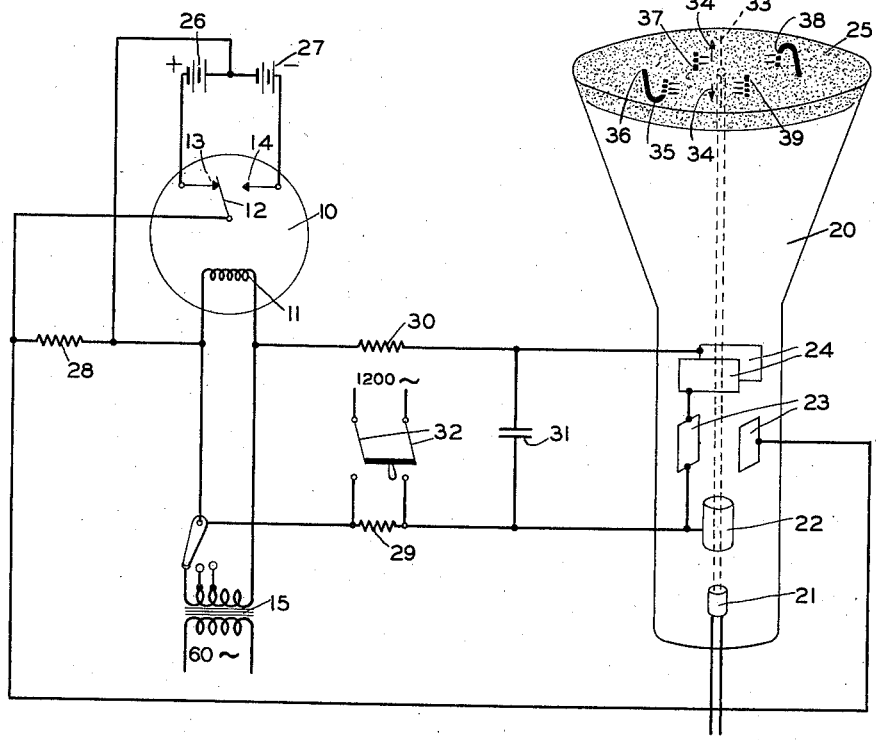
Fig. 1 is a circuit diagram of test apparatus embodying the invention.

Referring to Fig. 1, a relay 10 under test is shown as comprising an operating winding 11 and a movable armature 12 adapted to engage stationary contacts 13 and 14, respectively. While the invention may be utilized in connection with various types of relays, the relay 10 may be assumed to be a polarized relay of the type disclosed in the above-mentioned Finn patents. The relay may include additional accelerating windings which for the purpose of test are left open.

In accordance with the preferred embodiment of the invention, means such as an alternating-current transformer 15 is provided for periodically energizing the polar relay 10. The ordinary polarized relay is adapted to respond to signals of the order of sixty cycles per second and therefore may be adequately tested by connecting the operating winding or windings to a source of sixty cycle alternating current of suitable potential, as represented by the alternating-current transformer 15.

In order to test other types of relays any suitable operating voltages may be utilized and an interrupter may be substituted for the alternating-current transformer 15, particularly for testing neutral relays. It will also be apparent to those skilled in the art that while the preferred embodiment of the invention includes means for periodically energizing and deenergizing the relay under test at a uniform rate to simulate actual operating conditions, it may in some instances be only necessary to operate the relay once or otherwise vary the testing method specifically set forth herein.

In accordance with the invention certain operating characteristics of the relay under test are determined or indicated by a cathode ray tube oscillograph 20. The oscillograph 20 may be of any suitable type, that shown being of a conventional type, and comprising a cathode 21, an anode 22, a pair of deflecting plates 23 and a pair of sweep plates 24. The beam may be magnetically controlled if desired. The end of the tube 20 is provided with a luminescent screen 25 whereby the movements of the beam of electrons from the cathode 21 as it is deflected electrostatically by the plates 23 and 24 are rendered visible.

In the testing system shown in the drawing by way of example, potentials are impressed upon the deflecting plates 23 in accordance with the position of the relay armature 12 and the sweep plates 24 are energized in synchronism with the operation of the relay, as for example by a potential derived from the transformer 15 in such a manner as to trace the recurrent phenomena during each cycle of operation of the relay.

In order to deflect the beam of the oscillograph in accordance with the position or movement of the relay armature, the deflection plates 23 may be connected in various ways to the relay structure. By way of example, batteries 26 and 27 are shown connected to the relay contacts 13 and 14, terminals of opposite polarity being connected to said contacts. A resistor 28 is connected in series with the relay armature 12 and the battery 26 or 27 in such manner that the potential drop across said resistor reverses in direction as the armature engages first one and then the other of the relay contacts and is zero when the armature is moving from one contact to the other. The potential drop across the resistor 28 is impressed upon the deflection plates 23 in series with a resistor 29. Thus as the relay 10 is energized and deenergized, the shifting potentials upon the deflection plates 23 deflect the beam of the oscillograph first in one direction and then in the other.

The sweep plates 24 are connected across the terminals of the secondary winding of the transformer 15 in series with the resistors 29 and 30. A condenser 31 is shunted across the sweep circuit between said resistors 29 and 30 and the sweep plates 24. A switch 32 may be arranged to impress an alternating current of a frequency which is a multiple of that supplied by the transformer 15, for example of 1200 cycles, across the terminals of the resistor 29 for a purpose that will be explained hereinafter.

The operation of the test set is as follows:— The axis of the screen 25 is represented by the dotted line 33. If there is no potential difference between the deflection plates 23, the alternating potential impressed upon the sweep plates 24 deflects the beam of the oscillograph from the center of the screen along the axis 33 of the screen in the directions indicated by the arrows 34. The movements of the cathode ray beam will be in synchronism with the energization and deenergization of the relay 10 inasmuch as the relay 10 and the sweep plates 24 are both energized from the transformer 15.

If it is assumed that the instantaneous value of the voltage applied to the relay 10 is a maximum and the armature 12 of the relay is held by the current traversing the relay winding in engagement with the contact 13 as indicated in the drawing, the beam of the oscillograph will be deflected to the point 35 on the screen 25 of the oscillograph. As the applied voltage decreases, the beam will travel to the point 36 before the armature 12 moves out of engagement with the fixed contact 13. As shown in the drawing, this point is above the center of the screen 25 indicating that the operating current passes through zero and starts to reverse in direction before the armature 12 starts to move. When the armature 12 moves out of engagement with the contact 13, the potential drop across the resistor 28 becomes zero and the beam of the oscillograph moves to the point 37.

As the armature 12 moves from the contact 13 to the contact 14, the beam of the oscillograph moves to the point 38, the deflection of the beam to the right hand side of the axis 33 of the screen resulting from the reversed potential drop across the resistor 28 which is now connected in series relation with the battery 27. On the other hand, during the time that the armature is moving from the contact 13 to the contact 14, the trace formed on the screen 25, as indicated at 37, is displaced slightly from the axis 33 because of the charging current taken by condenser 31 and the resulting potential drop in the resistor 29. This results in a separation between the trace 37 and the trace 39 formed while the armature is moving in the opposite direction. The potential drop in the resistor 29 during the interval when the armature of the relay is in engagement with one of the fixed contacts also changes the trace from a straight line into a partial loop, as indicated at 35—36. In this manner, the pattern on the screen of the oscillograph is subdivided into parts each representing one condition of the armature. Thus the traces at the opposite sides of the screen represent the intervals during which the armature is in engagement with the respective contacts 13 and 14, and the traces 37 and 39 represent the travel of the armature in opposite directions as the relay is energized and deenergized. As the relay is periodically energized, the screen pattern is retraced and a steady pattern formed which indicates the travel time of the armature, the balanced or unbalanced adjustment of the relay, etc.

Figure 2:
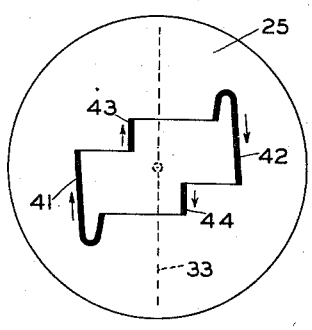
Figs. 2 and 3 are graphs of the traces obtained upon the oscillograph screen shown in Fig. 1 under different assumed conditions.

It will be noted that portions of the traces shown on the oscillograph screen in Fig. 1 are broken or irregular and consist of individual dots or closely spaced areas forming broken lines. This indicates contact chatter, the number of contact bounces being shown by the number of separate traces forming the outer portions of the pattern. When the relay is adjusted to eliminate contact chatter, the broken traces become continuous, as shown at 41 and 42, Fig. 2. Other contact troubles resulting from the presence of dirt or foreign matter, or other causes, also produce irregularities in the screen pattern and thus may be readily detected. The traces 43 and 44 indicate the travel time of the armature of the relay in opposite directions. The symmetrical character of the pattern shown in Fig. 2 indicates that the relay has no electrical or mechanical bias as such bias would result in unequal contact time or travel time of the armature and cause a corresponding distortion of the pattern.

Figure 3:
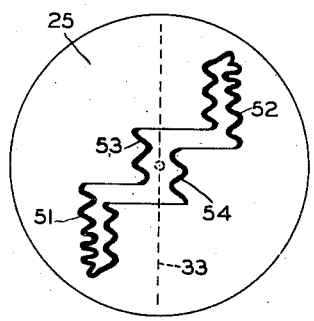

Since the frequency of the alternating current source 15 is known and the sweep of the cathode ray beam can be made directly proportional to time, as well known to those skilled in the art, the elapsed time of the various events represented by the screen pattern, as for example the travel time of the armature, may be accurately determined by measurement of the lengths of the traces forming the complete pattern. If desired, a high-frequency timing current may be superimposed upon the pattern shown in Fig. 2 by closing the switch 32. In this manner, a pattern similar to that shown in Fig. 3 will be obtained. If a timing current is employed, it is unnecessary to provide a linear sweep of the beam, the duration of each event being determined by counting the number of cycles of the timing current in the trace. The traces 51—54 correspond to the traces 41—44, respectively, of the pattern shown in Fig. 2, except that the pattern shown in Fig. 3 indicates that the adjustment of the relay has been changed so that the armature starts to move before the operating current drops to zero.

The invention is not limited to the specific embodiment described above as various modifications will occur to those skilled in the art and may be made without departing from the scope of the invention as set forth in the appended claims.

I claim:

1. The method of testing a relay provided with a movable armature with a cathode ray oscillograph, which comprises cyclically energizing the relay, synchronously sweeping the beam of the oscillograph and displacing said beam in accordance with the position of the armature of said relay.

2. The method of testing a relay with a cathode ray oscillograph which comprises starting to sweep the beam of the oscillograph as current is applied to the relay and displacing said beam laterally upon the opening of the contacts of said relay.

3. The method of testing a relay with a cathode ray oscillograph which comprises starting to sweep the beam of the oscillograph as current is applied to the relay and displacing said beam laterally upon the closing of the contacts of said relay.

4. Apparatus for testing relays provided with movable armatures comprising a cathode ray oscillograph having sweep plates and deflection plates, means for applying alternating potentials to the relay under test and to said sweep plates and means for energizing said deflection plates in accordance with the movement of the relay armature.

5. Apparatus for testing relays comprising a cathode ray oscillograph having sweep plates and deflection plates, a resistor, means for reversing the flow of current through said resistor as the relay under test is alternately energized and de-energized and connections from the terminals of said resistor to the deflection plates of the oscillograph.

6. Apparatus for testing relays provided with movable armatures comprising a cathode ray oscillograph, means for sweeping the beam of said oscillograph in synchronism with the operation of the relay under test and means for deflecting said beam laterally of the sweep movement in accordance with the position of the relay armature at any instant.

7. Apparatus for testing relays provided with movable armatures comprising a cathode ray oscillograph, means for sweeping the beam of said oscillograph in synchronism with the operation of the relay under test and means for deflecting said beam laterally of the sweep movement in accordance with the position of the relay armature at any instant and also independently thereof.

8. Apparatus for testing relays provided with movable armatures comprising a cathode ray oscillograph, means for sweeping the beam of said oscillograph concurrently with the operation of the relay under test and means for deflecting the beam as the relay armature moves.

9. Apparatus for testing relays provided with contacts comprising a cathode ray oscillograph, means for sweeping the beam of said oscillograph concurrently with the operation of the relay under test and means for deflecting the beam as the contacts of the relay close.

10. Apparatus for testing relays provided with contacts comprising a cathode ray oscillograph, means for sweeping the beam of said oscillograph concurrently with the operation of the relay under test and means for deflecting the beam as the contacts of the relay open.

11. Apparatus for testing relays provided with movable armatures comprising a cathode ray oscillograph, means for sweeping the beam of said ossillograph concurrently with the operation of the relay under test and means for deflecting the beam laterally of the sweep movement at a substantially constant high frequency and also in accordance with the movement of the relay armature.

12. Apparatus for testing relays comprising a cathode ray oscillograph, means for deflecting the beam of said oscillograph in accordance with the movement of the relay armature and additional means for cyclically deflecting the beam along axes at right angles to each other.

13. Apparatus for testing relays provided with contacts comprising a cathode ray oscillograph, means for energizing the relay under test and means for deflecting the beam of the oscillograph continuously along one axis and along another axis upon the closure of the contacts of said relay to form a separate visible trace of each contact bounce occurring as the relay operates.

14. Apparatus for testing relays provided with armatures comprising a cathode ray oscillograph, means for operating the relay armature and means for deflecting the beam of the oscillograph in accordance with the position of the armature of said relay.

15. Apparatus for testing relays provided with contacts comprising a cathode ray oscillograph, means for operating the relay under test and means for deflecting the beam of the oscillograph in response to the opening of the contacts of said relay, said deflecting means including means to vary the oscillograph pattern as the time of the opening of said contacts varies.

16. Apparatus for testing relays provided with contacts comprising a cathode ray oscillograph, means for operating the relay under test and means for deflecting the beam of the oscillograph in response to the closing of the contacts of said relay, said deflecting means including means to vary the oscillograph pattern as the time of the closing of said contacts varies.

WILLIAM D. BUCKINGHAM.